(12) United States Patent
Webster, Jr. et al.

(10) Patent No.: US 6,227,516 B1
(45) Date of Patent: May 8, 2001

(54) QUICK-RELEASE MECHANISM FOR HARD DISK DRIVE

(75) Inventors: Leo H. Webster, Jr., Cary; Mohanlal Savji Mansuria, Apex; Vinod Kamath, Raleigh, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/362,428

(22) Filed: Jul. 28, 1999

(51) Int. Cl.[7] ............................. H05K 7/12; H05K 5/00
(52) U.S. Cl. ............................. 248/694; 361/685
(58) Field of Search ........................... 248/694; 361/684, 361/685, 726, 727; 312/9.47, 9.48, 9.9, 223.2

(56) References Cited

U.S. PATENT DOCUMENTS

| | | | |
|---|---|---|---|
| 5,673,180 | * | 9/1997 | Pernet ................................. 361/727 |
| 5,682,291 | * | 10/1997 | Jeffries et al. ....................... 361/727 |
| 5,806,949 | * | 9/1998 | Johnson ............................. 312/223.2 |
| 6,025,987 | * | 2/2000 | Allirot et al. ........................ 361/685 |
| 6,067,225 | * | 5/2000 | Reznikov et al. .................... 361/685 |
| 6,069,789 | * | 5/2000 | Jung .................................... 361/685 |
| 6,094,342 | * | 7/2000 | Dague et al. ........................ 361/685 |

* cited by examiner

*Primary Examiner*—Ramon O. Ramirez
*Assistant Examiner*—Jon Szumny
(74) *Attorney, Agent, or Firm*—J Bruce Schelkopf; Felsman, Bradley, Vaden, Gunter & Dillon, LLP

(57) ABSTRACT

A mounting tray for a hard disk drive has a base, a front wall, and a pair of side walls. A pair of latching mechanisms are located in each side wall. Each latching mechanism has a slide and a spring-like fastener. The fasteners have an unlocked position where they are biased away from the tray, and a locked position where the slides capture them against the side walls. A tapered pin extends inward from each fastener. With the latching mechanisms in their unlocked positions, a drive is placed in the tray. The slides are then moved to the locked positions such that the pins on the fasteners engage holes in the drive. The pins secure the drive from movement relative to the tray to facilitate hot plugging of the drive into a computer system.

3 Claims, 2 Drawing Sheets

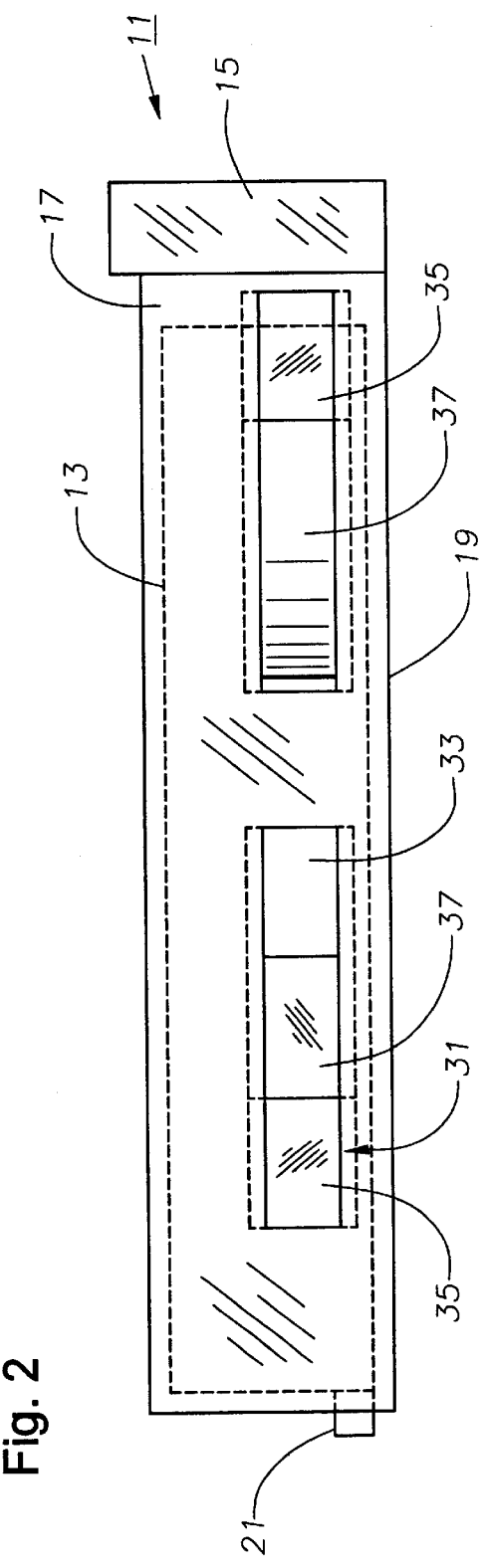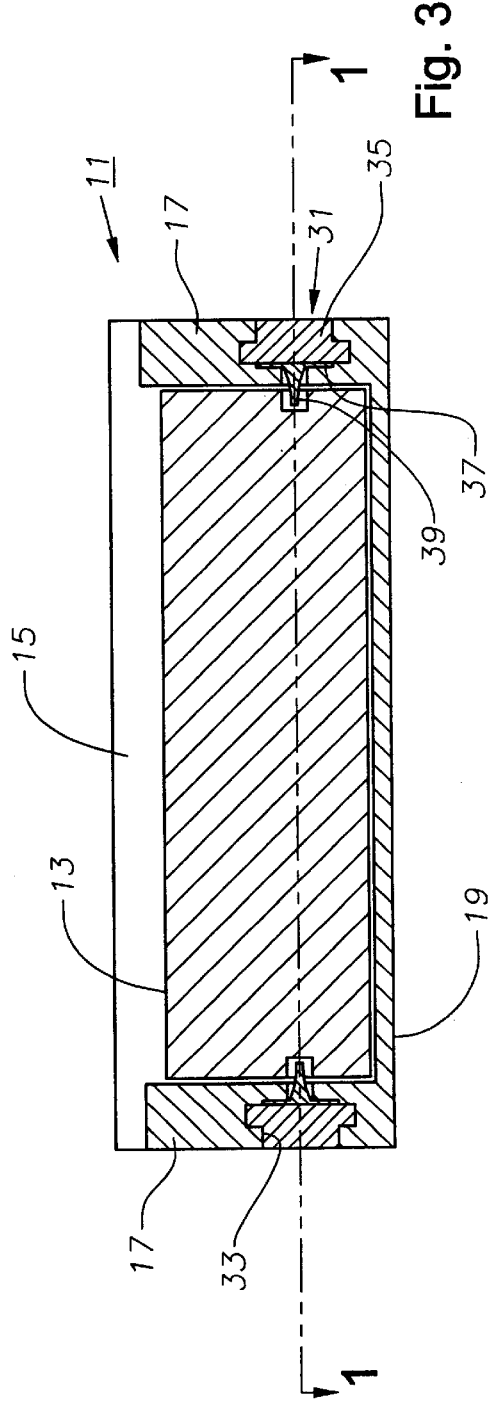

QUICK-RELEASE MECHANISM FOR HARD DISK DRIVE

TECHNICAL FIELD

This invention relates in general to hard disk drives and in particular to a quick-release mechanism for mounting a hard disk drive in a server hot-plug tray.

BACKGROUND ART

In operating computer systems, mounting trays are typically used to "hot plug" hard disk drives into the system. The mounting trays are slightly larger than the drives themselves, easier to handle, and provide some measure of electrostatic discharge protection. Unfortunately, prior art mounting trays also require mounting hardware such as screws to secure the disk drives on the trays. This configuration increases the assembly time during manufacturing, and the field repair time since there is additional mounting hardware to install or remove.

SUMMARY OF THE INVENTION

A mounting tray for a hard disk drive has a base, a front wall, and a pair of side walls. A pair of latching mechanisms are located in each side wall. Each latching mechanism has a slide and a spring-like fastener. The fasteners have an unlocked position where they are biased away from the tray, and a locked position where the slides capture them against the side walls. A tapered pin extends inward from each fastener. With the latching mechanisms in their unlocked positions, a drive is placed in the tray. The slides are then moved to the locked positions such that the pins on the fasteners engage holes in the drive. The pins secure the drive from movement relative to the tray to facilitate hot plugging.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIG. 2 is a sectional side view of the mechanism and drive of FIG. 1.

FIG. 3 is a sectional end view of the mechanism and drive of FIG. 1 taken along the line 3—3 of FIG. 1.

BEST MODE FOR CARRYING OUT THE INVENTION

Figure 1:
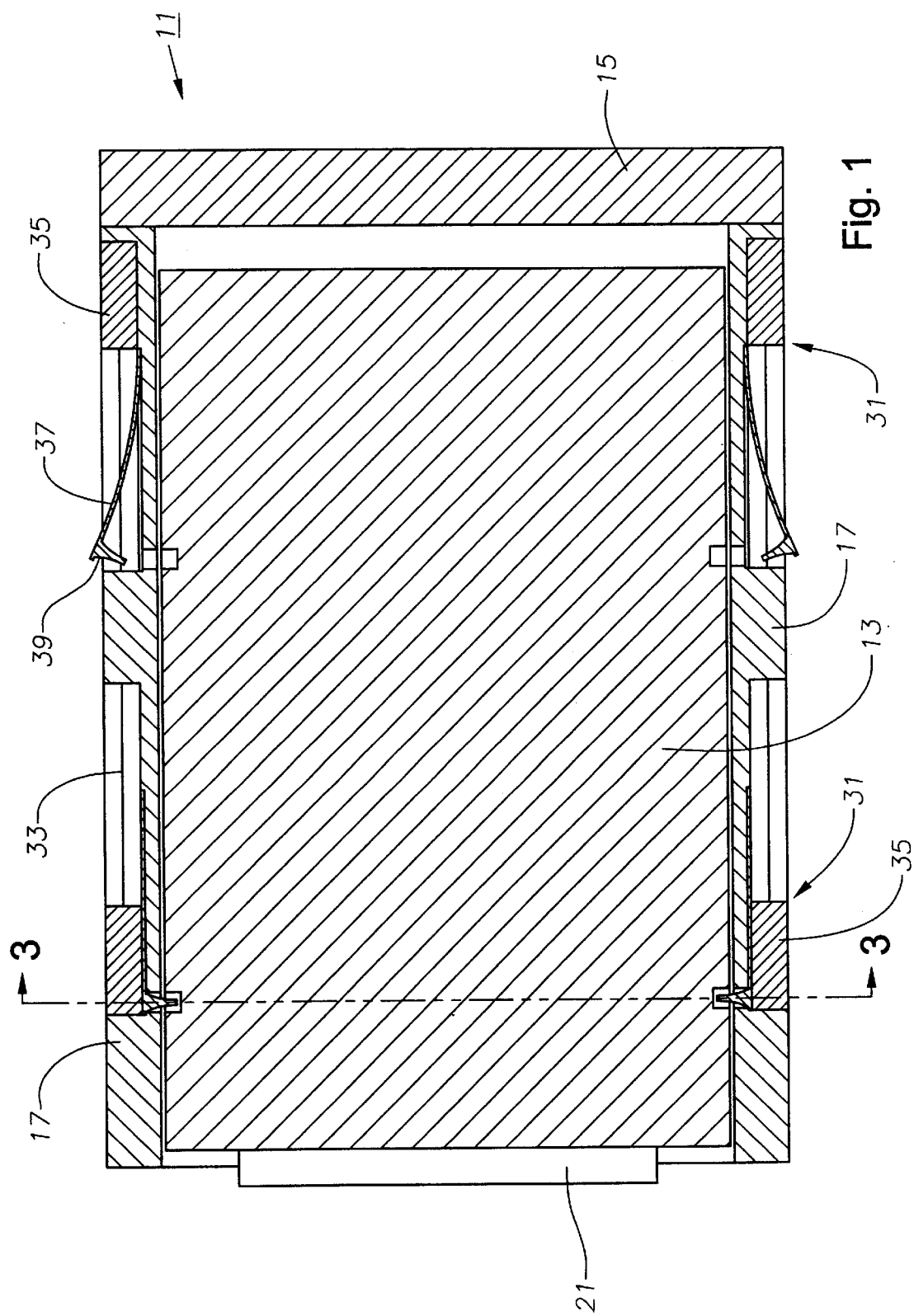
FIG. 1 is a plan view of a mechanism for mounting a hard disk drive and is constructed in accordance with the invention.

Referring to FIGS. 1–3, a mounting tray 11 for a conventional hard disk drive 13 is shown. Tray 11 comprises a hollow, generally rectangular member for closely receiving and hot-plugging drive 13 into an operating computer system (not shown). Tray 11 has a front bezel 15, a pair of parallel side walls 17 extending perpendicularly rearward therefrom, and an orthogonal base 19 which forms a lower surface. The upper surface and the rearward end of tray 11 are open for mounting drive 13 therein, and accommodating a hot plug connector 21 on the rearward end of drive 13, respectively.

Tray 11 also comprises a plurality of latching mechanisms 31 for securing drive 13 within its interior walls. Latching mechanisms 31 are permanently mounted in side walls 17. In the embodiment shown, tray 11 has a total of four latching mechanisms 31 (two in each side wall 17). Each lateral pair of latching mechanisms 31 is mounted within an elongated groove or channel 33 in side walls 17 (best shown in FIG. 3). The individual latching mechanisms 31 are spaced apart from one another near the corners of tray 11 and each comprises two captive components: a slide 35 and a fastener 37. In the preferred embodiment, slides 35 are flat, rectangular pieces of plastic that have a limited range of longitudinal movement within their respective channels 33. Fasteners 37 are substantially rectangular pieces of spring steel that are biased to an arcuate shape (FIG. 1). Fasteners 37 are cantilevered such that only their forward ends are rigidly mounted in channels 33. The rearward ends of fasteners 37 are movable between a biased or unlocked position (right side of FIG. 1) wherein they bend away from tray 11, and a locked position (left side of FIG. 1) wherein they are forced parallel to and flat against side walls 17. The positions of the individual fasteners 37 are independently selected by the position of their respective slides 35. Fasteners 37 are about twice as long as slides 35, but have approximately the same width. Each fastener 37 has an inward protruding, tapered mounting pin 39 centered near its rearward end.

In operation, all four latching mechanisms 31 of tray 11 are initially placed in their unlocked positions (like those on the right side of FIG. 1) prior to installing drive 13 in tray 11. This is done by sliding each slide 35 to its forwardmost position. At this point, slides 35 are substantially free of contact with fasteners 37 which move to their protruding, unlocked positions. In the unlocked position, pins 39 on fasteners 37 are located away from the interior cavity formed between side walls 17. This allows drive 13 to be placed in tray 11 and closely received between side walls 17. The forward end of drive 13 abuts the rear surface of front bezel 15 such that connector 21 protrudes slightly from the rearward end of tray 11.

The next step is to secure drive 13 within tray 11 by individually sliding each of the slides 35 rearward to their rearwardmost positions. This motion causes the inner, rearward edges of slides 35 to contact the smooth outer surfaces of their respective fasteners 37. Slides 35 are captive in channels 33 and easily overcome the outward bias of fasteners 37 to force them to the locked position (left side of FIG. 1). In the locked position, the rearward ends of slides 35 and their respective fasteners 37 are substantially flush with each other. The inner tips of pins 39 are thereby forced into the interior of tray 11 where they insert into pre-existing screw holes (not shown) in the sides of drive 13 (FIG. 3). The four pins 39 secure drive 13 from movement relative to tray 11 and make it easier to handle during the hot plug sequence which ensues.

The invention has several advantages. The hot plug tray is self sufficient and does not require any screws, hardware, or tools for installation or removal of the drive relative to the tray, or the tray/drive assembly relative to the operating computer system. These features shorten the assembly time and field repair time since there is no mounting hardware to install or remove.

While the invention has been shown or described in only some of its forms, it should be apparent to those skilled in the art that it is not so limited, but is susceptible to various changes without departing from the scope of the invention.

What is claimed is:

1. A tray for hot plugging a hard disk drive in a computer system, comprising:

a base;

a pair of side walls extending orthogonally from the base and each having an aperture, the side walls being parallel to each other and adapted to closely receive the hard disk drive therebetween;

an elongated channel in an outer surface of each of the side walls;

a flat spring mounted in each of the channels, each having a fixed end and a free end, the free end being biased outward relative to its respective side wall;

a pair of slides slidably mounted in each of the channels for linear movement relative to the springs; and wherein the slides have a locked position that is adapted to force the free end of the springs inward to engage the hard disk drive to secure it from movement relative to the tray, and an unlocked position that is adapted to release the free end of the springs to retract outward and free of contact with the hard disk drive to allow it to be removed from the tray.

2. The tray of claim 1, further comprising an additional flat spring and slide mounted in each of the channels.

3. The tray of claim 1 wherein each of the free ends of the springs has a tapered mounting pin on an inner surface that is adapted to insert into the hard disk drive.

* * * * *